April 23, 1940.  W. D. KMENTT  2,198,501
METHOD OF AND APPARATUS FOR NOTCHING STRIP MATERIAL
Filed Feb. 18, 1939  3 Sheets-Sheet 1
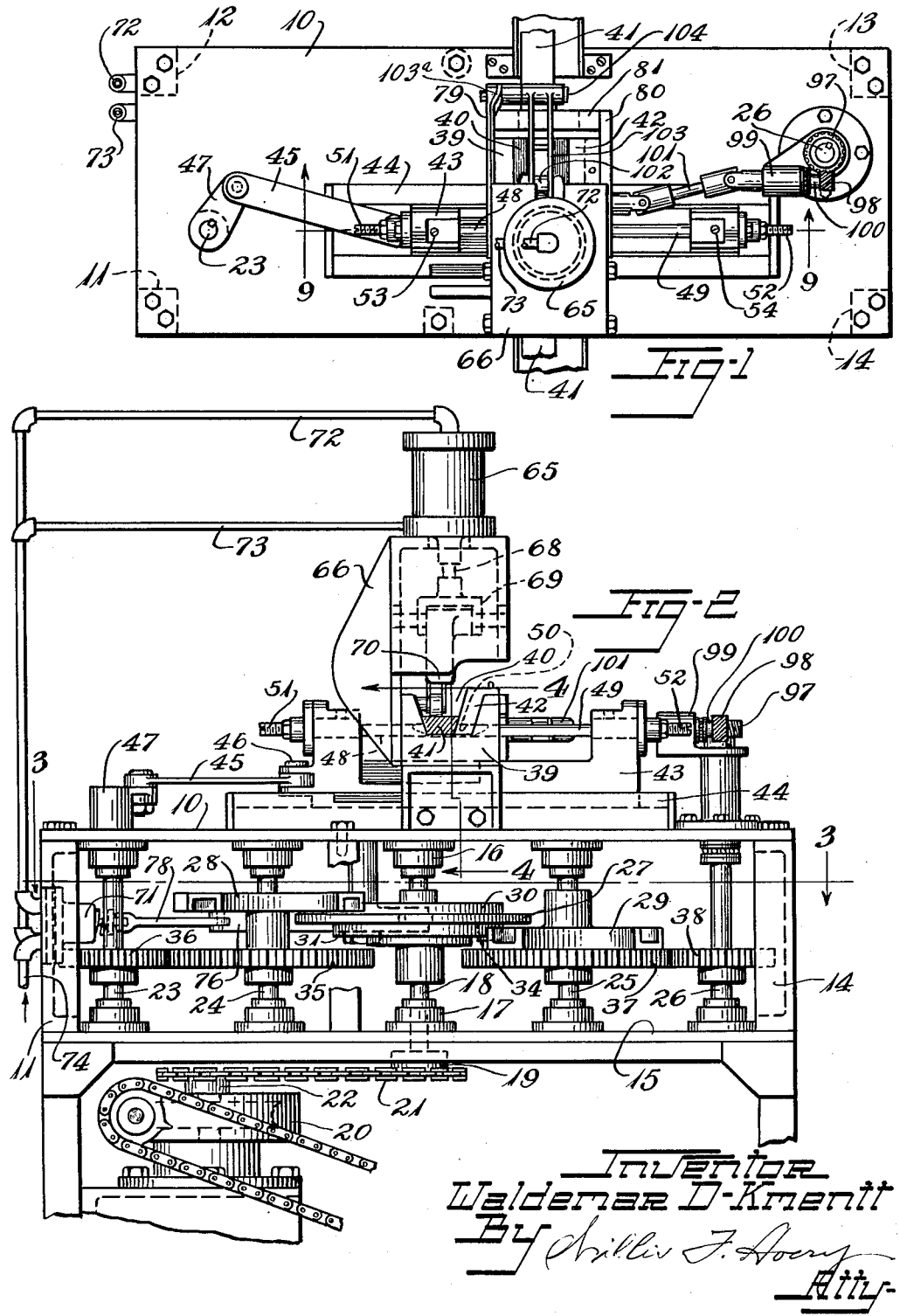

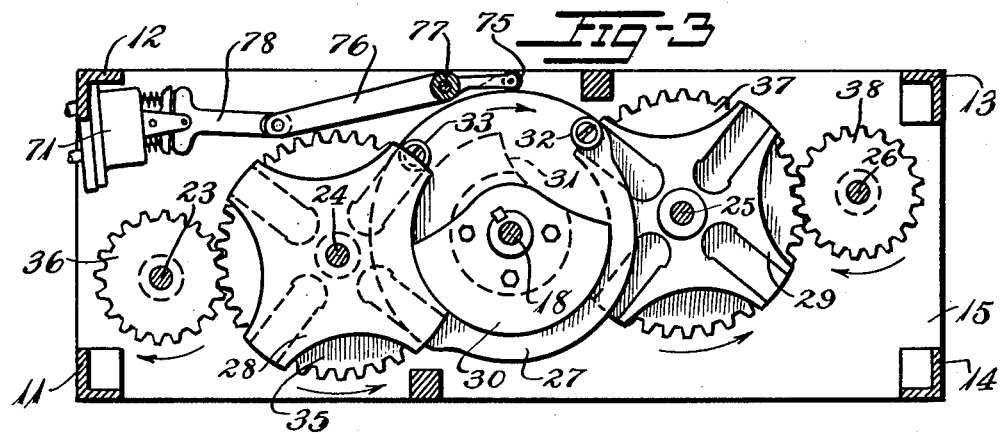
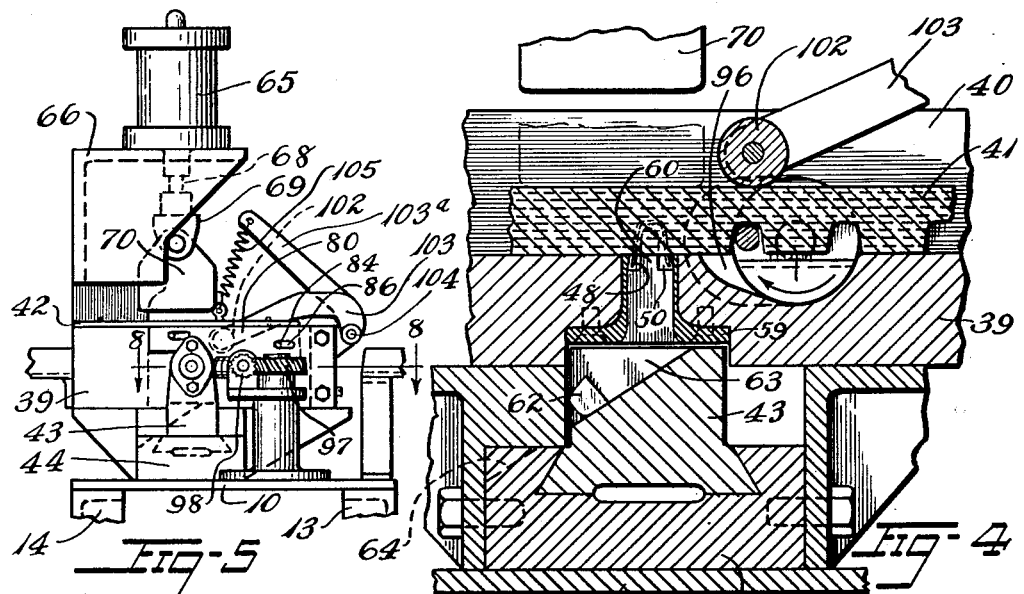
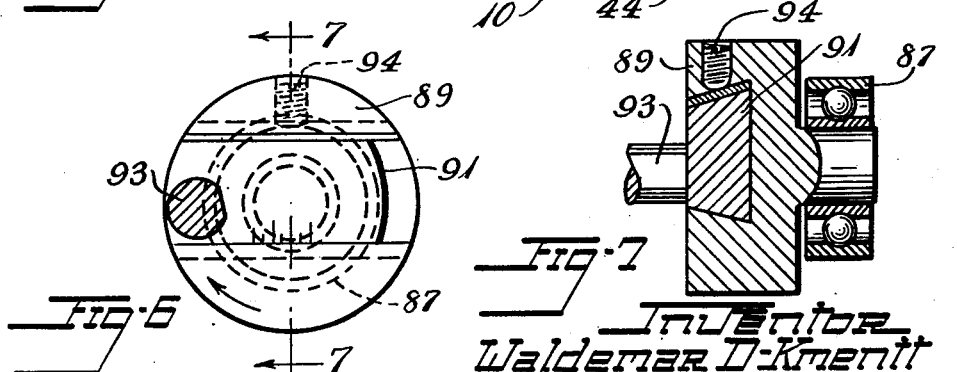

April 23, 1940.                W. D. KMENTT                2,198,501
             METHOD OF AND APPARATUS FOR NOTCHING STRIP MATERIAL
                  Filed Feb. 18, 1939        3 Sheets-Sheet 3
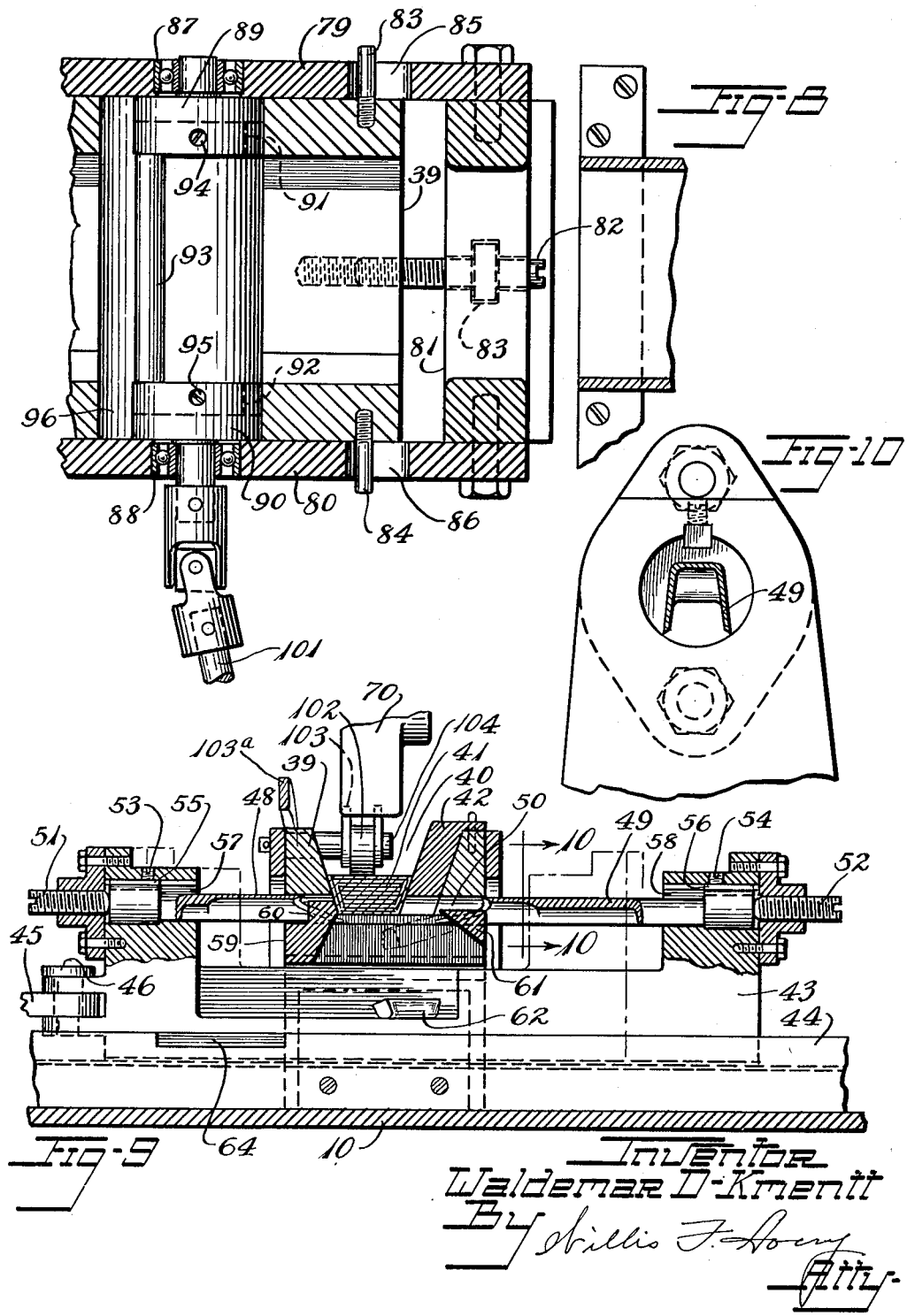

Patented Apr. 23, 1940

2,198,501

UNITED STATES PATENT OFFICE 2,198,501

METHOD OF AND APPARATUS FOR NOTCHING STRIP MATERIAL

Waldemar D. Kmentt, Akron, Ohio, assignor to The B. F. Goodrich Company, New York, N. Y., a corporation of New York Application February 18, 1939, Serial No. 257,105

12 Claims. (Cl. 164—50)

This invention relates to methods and apparatus for notching or otherwise cutting apertures in strip material and is especially useful in notching V-belts or other strips of rubber and fabric composition.

In the manufacture of side driving V-belts, especially where the belts are of large size, it is sometimes desired to form notches in the under face of the belt in order to increase the flexibility of the belt and to reduce lateral distortion due to bending. The present invention provides a method and apparatus for accomplishing such notching of a belt, preferably after vulcanization of the belt. Notching or other cutting operations may also be performed on belts or other strip materials whether in endless form or not.

The principal objects of the invention are to provide accuracy, economy, and efficiency of procedure, to provide a clean cut, to provide adjustability of notch or aperture spacing, to provide accommodation for strips of different dimensions, and to provide uniformity of product.

More specific objects are to provide for cutting the strip in endless form, to provide effectively for retaining the strip material for cutting and releasing and feeding the strip between cutting operations.

These and other objects will appear from the following description and the accompanying drawings.

Of the drawings:

Fig. 1 is a plan view of the apparatus in its preferred form.

Fig. 2 is an elevation of the same, parts being broken away.

Fig 3 is a cross sectional view taken on line 3—3 of Fig. 2 showing the timing mechanism.

Fig. 4 is a cross sectional view taken on line 4—4 of Fig. 2 showing the cutting and feed mechanism, parts being broken away.

Fig. 5 is an end elevation taken from the right of Fig. 1, parts being broken away.

Fig. 6 is a cross sectional detail view of the feed device.

Fig. 7 is a cross sectional detail view of the same taken on line 7—7 of Fig. 6.

Fig. 8 is a sectional detail of the feed mechanism taken on line 8—8 of Fig. 5, parts being broken away.

Fig. 9 is a sectional view of the cutting mechanism taken on line 9—9 of Fig. 1, parts being broken away.

Fig. 10 is a detail sectional view taken on line 10—10 of Fig. 10.

Referring to the drawings, the numeral 10 designates a bed plate of the apparatus which is supported by corner posts 11, 12, 13, 14. A similar plate 15 is supported therebelow and parallel thereto by the same posts. Rotatably mounted in bearings 16, 17 fixed to plates 10 and 15 respectively is a vertical shaft 18. The shaft 18 extends through plate 15 and has a sprocket 19 fixed thereto and adapted to be driven by a motor or other source of power (not shown) through a speed reducing unit 20 of the worm gear type. A chain 21 engages a sprocket 22 on the speed reducer and the sprocket 19 on the shaft 18. Other vertical shafts 23, 24, 25 and 26 are rotatably mounted between the plates 10 and 15 in similar bearings.

Fixed to the shaft 18 is a driving member 27 of a Geneva stop motion, and fixed to shafts 24 and 25 respectively are driven members 28, 29 each comprising star discs having four equidistant radial slots adapted to engage roller pins on the driver 27 and intervening arcuate locking surfaces adapted slidably to engage segmental discs 30, 31 fixed to the driver 27. Mounted on the upper face of the driver are two roller pins 32, 33 located 90 degrees apart and adapted to engage the slots in driven member 28, the arrangement is such that with the parts as shown in Fig. 3 the shaft 18 is constantly turning in the direction of the arrow, driven member 28 is locked, and pin 33 is just leaving the driven member. After 180 degrees rotation of shaft 18 roller 32 enters a radial slot and rotates shaft 24 a quarter turn, then pin 33 has entered the next slot and continues to rotate shaft 24 through a second quarter turn. Shaft 24 therefore rotates a half turn during each rotation of shaft 18 and operates intermittently, rotating half the time.

A single roller pin 34 on the under side of the driving element 27 is adapted to engage the radial slots in the driven member 29 which it rotates intermittently 90 degrees at a time and once for each revolution of shaft 18.

Shaft 24 has a gear 35 fixed thereto adapted to engage a smaller gear 36 fixed to shaft 23. The rotation being two to one so that shaft 23 is rotated intermittently through a complete revolution for each movement while shaft 18 is rotated one revolution.

A gear 37 fixed to shaft 25 drives a smaller gear 38 fixed to shaft 26, the ratio being two to one so that shaft 26 is rotated intermittently through 180 degree movements, one for each rotation of shaft 18.

To support the strip to be notched, an anvil block 39 is supported above bed plate 10 and has a groove 40 in its upper face to receive and embrace the strip 41. In the example shown the groove is of V-shape with sloping sides so as to fit a V-belt. Removable shim blocks 42 are provided to permit adjusting the size and shape of the channel.

Notching of the strip is accomplished by a pair of opposed cutters which alternately cut from opposite sides of the strip. For this purpose a slide 43 is adapted to reciprocate crosswise of the groove 40 by engagement in a dove tailed guide 44 fixed to plate 10. A connecting rod 45 is pivoted at one end, as at 46, to slide 43, and at the other to a crank 47 fixed to crank shaft 23. A gouge or channeled cutting tool 48 and a similar gouge 49 are fixed to opposite ends of the slide 43, facing each other in alignment and adapted to operate in a clearance channel 50 through the anvil block 39. Adjusting screws 51, 52 are provided to adjust the cutters lengthwise of the slide. Locking screws 53, 54 clamp them to the slide and keys 55, 56 prevent rotative movement of the cutters in sockets 57, 58 formed in the slide.

Each of the cutting tools 48, 49, as shown in Fig. 9, has a sharp end edge adapted to cut freely through the strip material by endwise movement of the tool. The edges are generally askew or oblique with respect to the direction of movement of the cutter, as shown in Fig. 9, with that portion of the inclined edges nearest their open or lower sides further advanced in their direction of travel than other portions of the edges so that cutting friction is reduced, and cuts are incised at the faces of the strip adjacent the proposed notch in advance of separation of the slug of material from the body of the strip by cutting pressure applied to each face in a direction having a component normal to that face, thereby avoiding tearing of the strip or separation of its plies due to the cutting action. In the preferred form of cutting tool, illustrated in the drawings, that part of the cutting edge fartherest away from the open or lower sides of the cutters or at the deepest portion of the desired notch is inclined in the opposite direction to provide cutting edges less advanced in the direction of travel of the cutters than the advanced portions of the cutting edges previously mentioned but more advanced than portions therebetween so that cutting is completed along the bottom wall of the notch, or at the top surface of the cutters in Fig. 9, in advance of complete severance of the slug from the strip. This reversal of inclination of the cutting edge acts substantially to counteract or balance forces tending to spring the cutters away from the strip in a downward direction as to Fig. 9 or toward the mouth of the notch and induced by the general inclination of the lower edges of the cutters, thereby making possible a straight cut through the material.

To assist in guiding the cutters a guide block 59 is mounted in the channel between the slide 43 and the anvil block 39 and is formed at one end with a lug 60 adapted to enter the groove in the cutter 48 to support the strip during action of the cutter 49, and at the other end with a sharp lug 61 adapted to enter the groove of cutter 49 to strip punched material from the cutter.

At each revolution of the crank 47, the cutter 48 advances and is pushed only part way through the strip. It is then withdrawn and the other cutter 49 is pushed through the strip from the other side. A slug 62 is retained by the cutter but is stripped therefrom by the lug 61 and drops into a pocket 63 in the slide 43 from which because of the inclined bottom of the pocket it may be discharged to one side of the slide at a position further along the guide 44, as at 64.

For holding the strip against the channel 40 during the cutting operation, a cylinder 65 is mounted above the bed plate 10 by a rigid support 66. A double acting piston therein is connected by a piston rod 68 to a cross head 69 guided in the support 66. A block 70 is pivotally suspended by the cross head over the work channel. A four way valve 71 is connected to opposite ends of the cylinder by pipes 72, 73 and also has a fluid pressure supply pipe 74. Driver member 27 has its margin formed with a cam face adapted to actuate a roller 75 mounted on an arm 76 pivoted at 77 to base plate 10. The other end of arm 76 engages the operating lever 78 of the valve 71. The arrangement is such that during half of each revolution of shaft 18, or while the slide 43 is stationary the block 70 is elevated above the strip to be cut, and during the other half revolution, during which the cutter slide is moving, the block is depressed by the cylinder against the strip to be cut, clamping it in the groove.

For moving the strip step by step between cutting movements, a sliding frame comprising assembled side members 79, 80 and an end plate 81 is slidably mounted around the anvil block 39 and is movable lengthwise thereof. An adjusting screw 82 is threaded in the anvil block and engages a notch 83 in the end plate 81 for adjusting purposes. Pins 83, 84 fixed to the anvil block extend through slots 85, 86 in the side plates 79, 80 to guide the sliding frame. Rotatably mounted in bearings 87, 88 in the side plates are a pair of opposed heads 89, 90. These are slotted radially to receive a pair of sliding members 91, 92 connected to each other by a rod 93 extending parallel to the axis of rotation of the heads. The rod is adjustable radially of the heads and is locked in place by set screws 94, 95. A clearance slot 96 is formed in the anvil block cross-wise of the work-supporting channel to clear the heads and the bar 93.

The bar 93 is used to advance the notched strip by engaging in the notches of the strip in succession. For accomplishing this movement, a worm gear 97 is fixed to the upper end of shaft 26 and engages a worm gear 98 journaled in a bracket 99 on a shaft 100. Shaft 100 drives roll head 90 through a universal joint coupling 101 which permits adjustment of the feeding device with relation to the cutting mechanism to provide different spacing of the notches. The arrangement is such that the roll head 90 carrying the feed bar 93 rotates one complete revolution and stops, its movement taking place between cutting movements.

As the movement of the feed bar 93 is a movement of rotation, the bar lifts the belt strip in the groove 40 as it moves the belt strip forward. This lifting movement releases the strip from frictional engagement in the groove, the spring pressed roller 102 assuring its return at the end of the feeding movement to groove engaging position.

To provide for holding the strip of material in the trough, a presser roller 102 is rotatably mounted on an arm 103, fixed on a rod 104 rotatably mounted on the plate 79. A tension coil spring 105, has one end attached to an arm 103 fixed to the rod 104 and the other to the anvil block so as to urge the roller downwardly against the strip.

To permit notching of endless belts, the frame 66 is supported from one side only of the anvil block.

The operation of the apparatus will be clear from the above description, and for convenience may be generally summarized as follows:

The rod 93 is adjusted so that its orbit is equal in diameter to the desired spacing of the notches, and the slide frame 91 is then adjusted so that at its nearest position of repose, the rod 93 is correctly spaced from the cutters. A belt or other strip to be notched is then placed in the channel in the anvil block and under the presser roll 102. Where the belt is an endless V belt it is first turned inside out. The machine is then started. Cutter 48 enters the belt or other strip partially cutting therethrough before being withdrawn. Directly thereafter cutter 49 is advanced making a cut which meets the cut previously made and releases a slug 62 of waste material. The presser foot 70 is then automatically lifted from the work and the bar 93 operates to loosen and advance the strip by engaging a notch previously made and pushing the strip upward and forward. The presser foot is automatically lowered and the operations repeated.

By driving the first cutter only part way through the strip, breaking away of the strip at the opposite side by separation of the fabric plies or other material is avoided.

Various modifications of the invention may be made without departing from its scope as defined by the following claims.

I claim:

1. The method of notching strip material which comprises intermittently advancing the strip endwise, clamping the strip against a support between advancing movements, and cutting a notch across the strip during each clamping operation by cuts directed from opposite ends of the desired notch.

2. The method of notching strip material which comprises partially separating a slug of material from the strip by a single cut directed against the strip from one end of the desired notch, and completing the notch by a single cut directed in the opposite direction.

3. The method of notching a strip of material of trapezoidal cross section having a narrow face to be notched and adjacent sides inclined thereto, which comprises advancing the strip step by step along a V-shaped guideway with its sloping faces contacting the faces of the guideway, clamping the strip against the guideway between successive movements by force directed toward the guideway in a direction to wedge the strip between its inclined faces, and cutting a notch across the face of the strip by cuts directed from one side of said guideway toward the other at a position between the ends of said guideway while the strip is held laterally clamped at the line of cutting against spreading by the inclined faces of the guideway.

4. The method of notching strip material of trapezoidal cross section having a narrow face to be notched and adjacent sides inclined thereto, which comprises advancing the strip step by step along a V-shaped guideway with its sloping faces contacting the faces of the guideway, clamping the strip against the guideway between successive movements by force directed toward the guideway in a direction to wedge the strip between its inclined faces, and cutting a notch across the face of the strip while the strip is held against spreading by the inclined faces of the guideway by successive aligned cuts directed from opposite sides of the strip.

5. Apparatus for notching a strip of material of trapezoidal cross section having a narrow face to be notched and adjacent sides inclined thereto, said apparatus comprising a V-shaped guideway, means for advancing the strip of material step by step along said guideway, means movable in a direction lateral to the direction of cutting for clamping the strip at the line of the proposed notch between the inclined sides of the guideway between successive movements of the strip to prevent spreading of the strip, and means located between the ends of the guideway for cutting a notch across the face of the strip while it is clamped in the guideway at the line of the proposed notch by a cutting movement directed against one of its inclined sides.

6. Apparatus for notching a strip of material of trapezoidal cross section having a narrow face to be notched and adjacent sides inclined thereto, said apparatus comprising a V-shaped guideway, means for advancing the strip of material step by step along said guideway, means for clamping the strip between the inclined sides of the guideway between successive movements of the strip to prevent spreading of the strip, and means for cutting a notch across the face of the strip while it is clamped in the guideway, said cutting means comprising a pair of opposed cutting tools for successively cutting partially across the strip from opposite sides thereof.

7. Apparatus for notching a strip of material of trapezoidal cross section having a narrow face to be notched and adjacent sides inclined thereto, said apparatus comprising a V-shaped guideway adapted to support the strip at the proposed notch, means for advancing the strip of material step by step along said guideway, means for clamping the strip between the inclined sides of the guideway between successive movements of the strip to prevent spreading of the strip, and means located between the ends of said guideway for cutting a notch across the face of the strip while it is clamped in the guideway at the line of the proposed cut by a cutting movement directed toward one of its inclined sides, said means for advancing the strip comprising a member adapted to engage in a previously cut notch in the strip and having movement with respect to said guideway.

8. Apparatus for notching a strip of material across a face thereof, said apparatus comprising means for supporting the strip against spreading, a pair of sharp edged hollow cutters mounted in alignment with each other and facing opposite sides of the strip, means for driving one of the cutters partially through the strip from one side thereof, and means for driving the second cutter across the strip from the opposite direction to complete the notch.

9. Apparatus for notching a strip of material across a face thereof, said apparatus comprising means for supporting the strip, a pair of sharp edged hollow cutters mounted in alignment with each other and facing opposite sides of the strip, means for driving one of the cutters partially through the strip from one side thereof, and means for driving the second cutter across the strip from the opposite direction to complete the notch, said cutters having their cutting edges generally oblique with respect to their direction of travel.

10. Apparatus for notching a strip of material across a face thereof, said apparatus comprising means for supporting the strip, a pair of sharp edged hollow cutters mounted in alignment with each other and facing opposite sides of the strip, means for driving one of the cutters partially through the strip from one side thereof, and means for driving the second cutter across the strip from the opposite direction to complete the notch, said cutters having their cutting edges generally oblique with respect to their direction of travel and most advanced in the region of the face of the strip to be notched.

11. Apparatus for notching a strip of material across a face thereof, said apparatus comprising means for supporting the strip, a pair of sharp edged hollow cutters mounted in alignment with each other and facing opposite sides of the strip, means for driving one of the cutters partially through the strip from one side thereof, and means for driving the second cutter across the strip from the opposite direction to complete the notch, said cutters having their cutting edges generally oblique with respect to their direction of travel with their most advanced portions in the region of the face of the strip to be notched, and having other portions in the region of the base of the notch less advanced than the first said portions but advanced beyond portions intermediate the first and second said portions.

12. Apparatus for notching a strip of material across a face thereof, said apparatus comprising means for supporting the strip, a pair of sharp edged hollow cutters mounted in alignment with each other and facing opposite sides of the strip, means for driving one of the cutters partially through the strip from one side thereof, and means for driving the second cutter across the strip from the opposite direction to complete the notch, said cutters having their cutting edges oblique to their direction of travel and inclined in different directions at different portions thereof to oppose forces tending to deflect the cutters and having their more advanced portions at the face of the strip and at the deepest part of the zone of the strip to be removed.

WALDEMAR D. KMENTT.